US008891724B2

(12) United States Patent
Kim et al.

(10) Patent No.: US 8,891,724 B2
(45) Date of Patent: Nov. 18, 2014

(54) DUAL-COOLED NUCLEAR FUEL ROD HAVING ANNULAR PLUGS AND METHOD OF MANUFACTURING THE SAME

(75) Inventors: Hyung-Kyu Kim, Daejeon (KR); Jong-Hun Kim, Daejeon (KR); Dae-Ho Kim, Daejeon (KR); Kun-Woo Song, Daejeon (KR); Kyung-Ho Yoon, Daejeon (KR); Young-Ho Lee, Daejeon (KR); Jae-Yong Kim, Daejeon (KR); Kang-Hee Lee, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 1021 days.

(21) Appl. No.: 12/559,059

(22) Filed: Sep. 14, 2009

(65) Prior Publication Data
US 2010/0266094 A1    Oct. 21, 2010

(30) Foreign Application Priority Data
Apr. 15, 2009  (KR) .......................... 10-2009-032747

(51) Int. Cl.
*G21C 3/00* (2006.01)
*G21C 3/02* (2006.01)
*G21C 3/10* (2006.01)
*G21C 21/02* (2006.01)

(52) U.S. Cl.
CPC .. *G21C 3/02* (2013.01); *G21C 3/10* (2013.01); *G21C 21/02* (2013.01); *Y02E 30/40* (2013.01)
USPC ....................................................... 376/416

(58) Field of Classification Search
CPC ............. G21C 3/02; G21C 3/10; Y02E 30/40
USPC ......................................................... 376/416
See application file for complete search history.

(56) References Cited

U.S. PATENT DOCUMENTS 3,862,461 A * 1/1975 Bucklitzsch .................... 15/164
3,887,003 A * 6/1975 Polcer et al. .................. 165/142
(Continued)

FOREIGN PATENT DOCUMENTS

JP   1994249994 A   9/1994
JP   1994273580 A   9/1994
(Continued)

OTHER PUBLICATIONS

"Fillet Weld", web page http://www.answers.com/topic/fillet-weld?cat=technology, Aug. 18, 2007 version.*
(Continued)

*Primary Examiner* — Frank J McGue
(74) *Attorney, Agent, or Firm* — Maier & Maier, PLLC

(57) ABSTRACT

A dual-cooled nuclear fuel rod and a method of manufacturing the same are provided. The nuclear fuel rod includes an outer cladding tube having a circular cross section, an inner cladding tube having an outer diameter smaller than an inner diameter of the outer cladding tube, and a length longer than the outer cladding tube, and located in parallel in the outer cladding tube, a pellet charged in a space between the outer and inner cladding tubes and generating energy by nuclear fission, and first and second end plugs coupling opposite ends of the outer cladding tube to stepped outer joints formed on outer circumferences of first ends thereof and coupling opposite ends of the inner cladding tube to stepped inner joints formed on inner circumferences of the first ends thereof.

5 Claims, 10 Drawing Sheets

(56) References Cited

U.S. PATENT DOCUMENTS

| | | | | |
|---|---|---|---|---|
| 4,542,267 | A | * | 9/1985 | Christiansen et al. ........ 219/604 |
| 4,591,133 | A | * | 5/1986 | Umeno et al. ................ 266/114 |
| 4,971,750 | A | | 11/1990 | Duncan et al. |
| 5,158,740 | A | | 10/1992 | Boatwright |
| 5,816,292 | A | | 10/1998 | Wilson |
| 6,012,514 | A | * | 1/2000 | Swain ........................... 165/154 |
| 2007/0258556 | A1 | * | 11/2007 | Song et al. .................... 376/455 |
| 2008/0013667 | A1 | * | 1/2008 | Oh et al. ....................... 376/451 |
| 2010/0128835 | A1 | * | 5/2010 | Yoon et al. .................... 376/426 |

FOREIGN PATENT DOCUMENTS

| | | | |
|---|---|---|---|
| JP | 1996122472 A | | 5/1996 |
| JP | 1996129090 A | | 5/1996 |
| KR | 20080019876 A | | 3/2008 |
| WO | WO08702125 | * | 4/1987 |

OTHER PUBLICATIONS

"Joint Design and Preparation of Metals", web page http://www.mydiscounttools.com/estore/articles/welding/WeldingJOINTS.html, Jun. 21, 2008 version.*

"Print Reading and Welding Symbols", web page http://www.mydiscounttools.com/estore/articles/welding/Weldingreading.html, Feb. 11, 2007 version.*

Web page, "FLash Butt Welding", Sep. 2006 version.*

Larry E. Moss, web page, "Tube and Pipe Fabrication", Feb. 28, 2002.*

* cited by examiner

DUAL-COOLED NUCLEAR FUEL ROD HAVING ANNULAR PLUGS AND METHOD OF MANUFACTURING THE SAME

CROSS-REFERENCES TO RELATED APPLICATION

This patent application claims the benefit of priority under 35 U.S.C. §119 from Korean Patent Application No. 10-2009-0032747 filed on Apr. 15, 2009, the content of which is incorporated herein by reference.

BACKGROUND OF THE INVENTION

1. Field of the Invention

The present invention relates, in general, to a dual-cooled nuclear fuel rod having annular plugs and method of manufacturing the same and, more particularly, to a dual-cooled nuclear fuel rod required to increase output of a standard pressurized light water atomic power plant on a large scale, and a method of manufacturing the dual-cooled nuclear fuel rod, capable of having direct application of welding of the dual-cooled nuclear fuel rod.

2. Description of the Related Art

Just as a fossil fuel such as oil or coal is needed to operate a thermoelectric power plant, nuclear fuel is needed to operate an atomic power plant. Here, as the requisite nuclear fuel, a nuclear fissile material is used. First, the nuclear fissile material is formed into a ceramic pellet called a sintered compact, and the pellet is inserted into a metal tube. Then, the metal tube is sealed with end plugs. Thereby, a nuclear fuel rod is completed. A set of nuclear fuel rods made in this way is fixed to a metal structure. This is called a nuclear fuel assembly. The pellet in the nuclear fuel rod causes a nuclear fission chain reaction to generate heat. This generated heat is transmitted to a coolant, and then is used as energy.

A conventional nuclear fuel rod has a cylindrical shape in which the pellet is charged in a hollow cylindrical cladding tube. Thus, when the heat is generated through the nuclear fission chain reaction, the heat generated adjacent to an outer circumference of the pellet placed into contact with the coolant is easily transmitted to the coolant, whereas the heat generated from the center of the pellet fails to be transmitted to the coolant. In this manner, the cylindrical nuclear fuel rod has low thermal conductivity.

Further, in a dual-cooled nuclear fuel rod composed of two cladding tubes having different diameters and end plugs, when the end plugs are welded to the cladding tubes in order to seal the pellet, a welding torch fails to approach a hollow part of the cladding tube having a small diameter, and thus the welding is difficult. Thus, the dual-cooled nuclear fuel rod is considerably restricted by the inner diameter of the cladding tube which the welding torch cannot approach.

SUMMARY OF THE INVENTION

Accordingly, the present invention has been made keeping in mind the above problems occurring in the related art, and example embodiments of the present invention are directed toward providing a dual-cooled nuclear fuel rod having annular plugs, in which a coolant is allowed to flow to the outside as well as the inside of the nuclear fuel rod, thereby rapidly transmitting heat from a pellet to the outside and inside of the nuclear fuel rod to increase thermal conductivity.

Example embodiments of the present invention are also directed toward providing a dual-cooled nuclear fuel rod having annular plugs, in which a heat transfer area of the nuclear fuel rod is increased to reduce the temperature of the nuclear fuel rod, thereby preventing damage to the nuclear fuel rod as well as a departure from nucleate boiling caused by the internal temperature of a pellet becoming higher than the temperature of a coolant.

Example embodiments of the present invention are also directed toward providing a method of manufacturing a dual-cooled nuclear fuel rod, in which, in connection with welding of the nuclear fuel rod having two cladding tubes having different diameters and two end plugs, the end plugs can be welded to the cladding tube, an inner diameter of which is reduced due to limited dimensional requirements of a nuclear fuel assembly which determine an inner diameter of the nuclear fuel rod.

Example embodiments of the present invention are also directed toward providing a method of manufacturing a dual-cooled nuclear fuel rod, capable of being applied to all components or industrial instruments having two tubes having different diameters and two annular plugs fixed to opposite ends of the tubes, and increasing industrial usefulness in the industrial sites due to high sealing efficiency of a pellet and easy welding.

According to an aspect of the present invention, there is provided a method of manufacturing a nuclear fuel rod. The method includes a fillet welding process of inserting and welding a first end of an inner cladding tube having a hollow cylindrical shape up to and to a stepped inner joint formed on an inner circumference of a first end of a first end plug having a hollow cylindrical shape, a pellet charging process of charging a pellet around an outer circumference of the inner cladding tube, a butt welding process of surrounding the pellet with an outer cladding tube having a hollow cylindrical shape, and inserting and welding a first end of the outer cladding tube up to and to a stepped outer joint formed on an outer circumference of the first end of the first end plug, and a finish welding process of performing edge welding of a second end of the inner cladding tube and an inner joint formed on an inner circumference of the second end plug, and performing butt welding of the second end of the outer cladding tube and an outer joint formed on an outer circumference of the first end of the second end plug.

Here, the welding processes may be performed by one selected from arc welding, gas welding, resistance welding, laser beam welding, electromagnetic beam welding, and thermit welding.

Further, the arc welding may include tungsten inert gas (TIG) welding.

Also, the resistance welding may include resistance pressure welding (RPW).

Further, each of the first and second end plugs may have an outer diameter equal to that of the outer cladding tube.

In addition, the first end plug may have an inner diameter equal to that of the inner cladding tube.

According to another aspect of the present invention, there is provided a dual-cooled nuclear fuel rod, which includes an outer cladding tube having a hollow cylindrical shape and a circular cross section in a longitudinal direction, an inner cladding tube having a hollow cylindrical shape, an outer diameter smaller than an inner diameter of the outer cladding tube, and a length longer than the outer cladding tube, and located parallel to the outer cladding tube in a hollow portion of the outer cladding tube, a pellet charged in a space between the outer and inner cladding tubes, and generating energy by nuclear fission, a first end plug having a hollow cylindrical shape, and preventing the pellet from escaping by coupling one end of the outer cladding tube to a stepped outer joint formed on the outer circumference of a first end thereof, and by coupling one end of the inner cladding tube to a stepped inner joint formed on an inner circumference of the first end thereof, and a second end plug having a hollow cylindrical shape, and sealing the pellet by coupling the other end of the outer cladding tube to a stepped outer joint formed on the outer circumference of a first end thereof, and by coupling the other end of the inner cladding tube to an inner circumference of the first end thereof.

Here, the dual-cooled nuclear fuel rod may further include a compression spring, which is installed between the pellet and the first end plug or between the pellet and the second end plug and fixes the pellet.

Further, the dual-cooled nuclear fuel rod may further include a filling gas, which transmits heat, which is generated from the pellet between the outer and inner cladding tubes, to the outer and inner cladding tubes.

Also, the filling gas may include helium.

Further, each of the first and second end plugs may have a coupling recess, which is formed in the outer circumference thereof and is coupled by a handling apparatus.

Further, the outer joint of each of the first and second end plugs may have a thickness equal to a difference between the outer and inner diameters of the outer cladding tube.

Furthermore, the inner joint of the first end plug may have a thickness equal to a difference between the outer and inner diameters of the inner cladding tube.

Further, the second end plug may have an inner diameter equal to the outer diameter of the inner cladding tube.

In addition, the outer joint of the second end plug may include at least one slit that allows a filling gas to be injected between the outer and inner cladding tubes.

As described above, according to the dual-cooled nuclear fuel rod having annular plugs, the nuclear fuel rod is composed of two cladding tubes having different diameters and two end plugs, and a coolant is allowed to flow to the outside as well as the inside of the nuclear fuel rod, thereby rapidly transmitting heat from a pellet to the outside and inside of the nuclear fuel rod to increase thermal conductivity.

Further, due to an increase in area where the nuclear fuel rod comes into contact with a coolant, heat generated from a pellet is rapidly transmitted to the coolant, thereby reducing a temperature of the nuclear fuel rod to prevent damage to the nuclear fuel rod as well as a departure from nucleate boiling.

According to the method of manufacturing a dual-cooled nuclear fuel rod, it is easy to manufacture the nuclear fuel rod in which end plugs are welded to a cladding tube, an inner diameter of which is reduced, and it is possible to increase sealing efficiency of a pellet.

Further, it is able to be used in all industrial sites which have two tubes of different diameters welded to annular plugs at opposite ends thereof, and to increase industrial usefulness.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
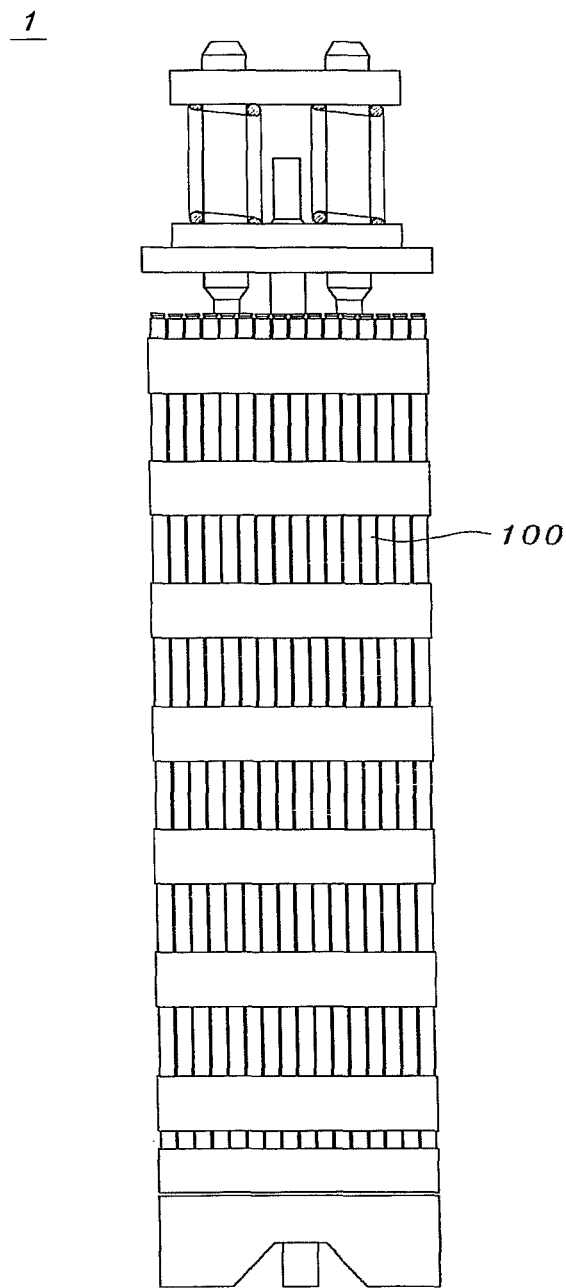
FIG. 1 illustrates a nuclear fuel assembly using a dual-cooled nuclear fuel rod having annular plugs according to an embodiment of the present invention.

Reference will now be made in greater detail to example embodiments of the invention with reference to the accompanying drawings. First, it should be noted that, similar elements or parts have been designated by the same reference numerals in the drawings. In the description of the embodiments, the detailed description of related known functions or configurations will be omitted herein to avoid making the subject matter of the described embodiments ambiguous.

Figure 2:
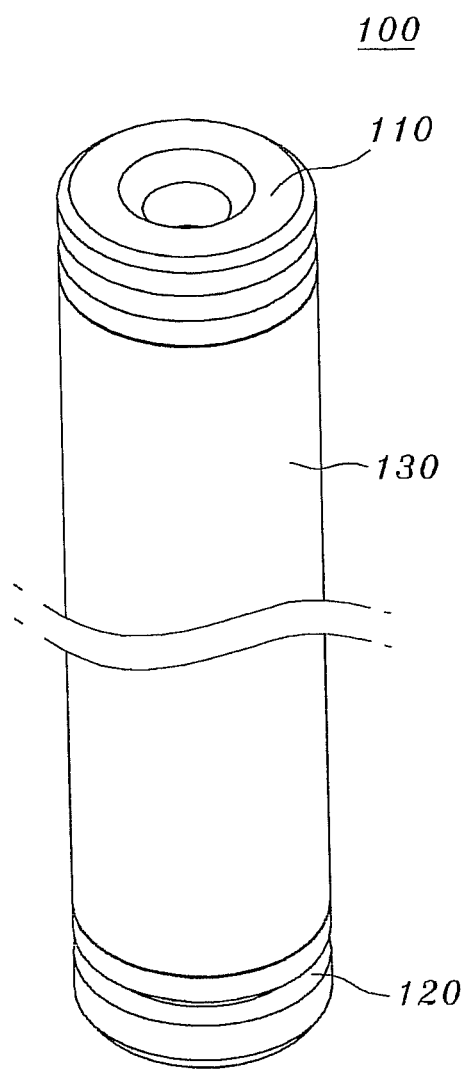
FIG. 2 is a perspective view illustrating a dual-cooled nuclear fuel rod having annular plugs according to an embodiment of the present invention.
Figure 3:
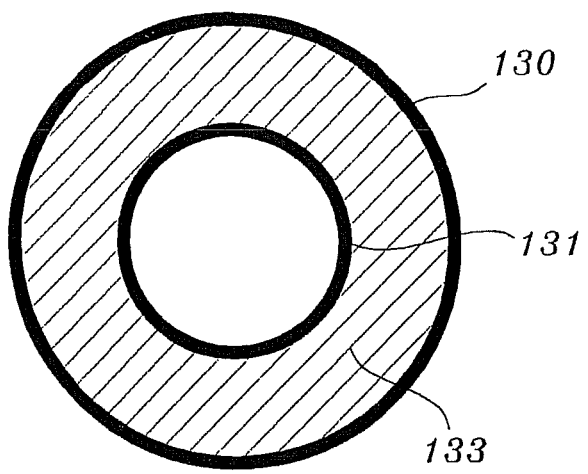
FIG. 3 is a cross-sectional view illustrating a dual-cooled nuclear fuel rod having annular plugs according to an embodiment of the present invention.
Figure 4:
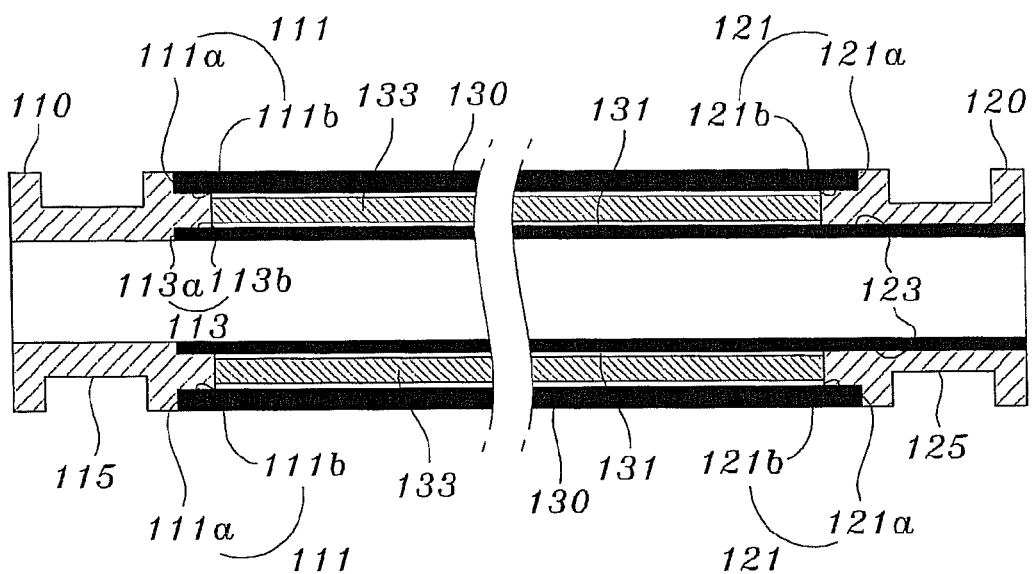
FIG. 4 is another cross-sectional view illustrating a dual-cooled nuclear fuel rod having annular plugs according to an embodiment of the present invention.

FIG. 1 illustrates a nuclear fuel assembly using a dual-cooled nuclear fuel rod having annular plugs according to an embodiment of the present invention. FIG. 2 is a perspective view illustrating a dual-cooled nuclear fuel rod having annular plugs according to an embodiment of the present invention. FIGS. 3 and 4 are cross-sectional views illustrating a dual-cooled nuclear fuel rod having annular plugs according to an embodiment of the present invention.

The dual-cooled nuclear fuel rod having annular plugs according to an embodiment of the present invention is a constituent of the nuclear fuel assembly 1 as illustrated in FIG. 1. Typically, hundreds of dual-cooled nuclear fuel rods 100, each of which has annular plugs, form one nuclear fuel assembly 1. One hundred and tens of nuclear fuel assemblies 1 are mounted in a nuclear reactor, generating energy.

Further, as illustrated in FIGS. 2, 3 and 4, the dual-cooled nuclear fuel rod 100 having annular plugs is configured so that first ends of first and second end plugs 110 and 120 are welded to opposite ends of outer and inner cladding tubes 130 and 131, thereby sealing a sintered compact (or a pellet) 133, which will be described below.

Hereinafter, a method of manufacturing a nuclear fuel rod according to an embodiment of the present invention will be described in detail with reference to the accompanying drawings.

Figure 5:
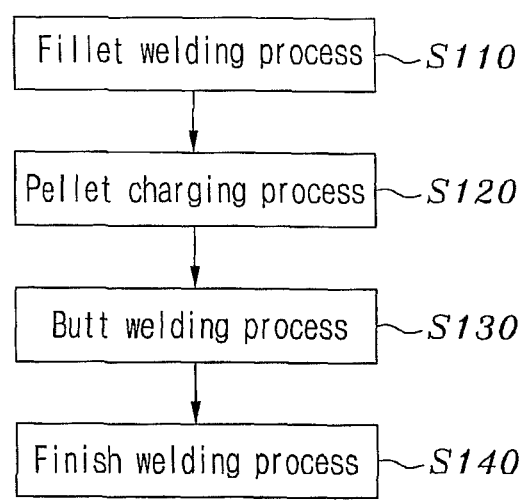
FIG. 5 is a block diagram illustrating a method of manufacturing a nuclear fuel rod according to an embodiment of the present invention.
Figure 6:
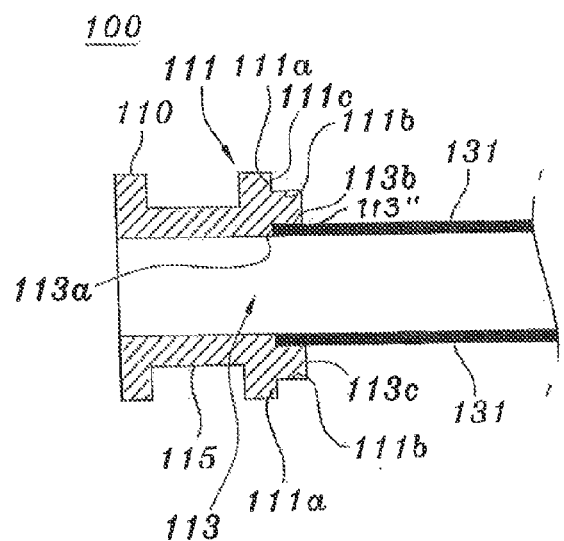
FIG. 6 illustrates a fillet welding process in a method of manufacturing a nuclear fuel rod according to an embodiment of the present invention.
Figure 6A:
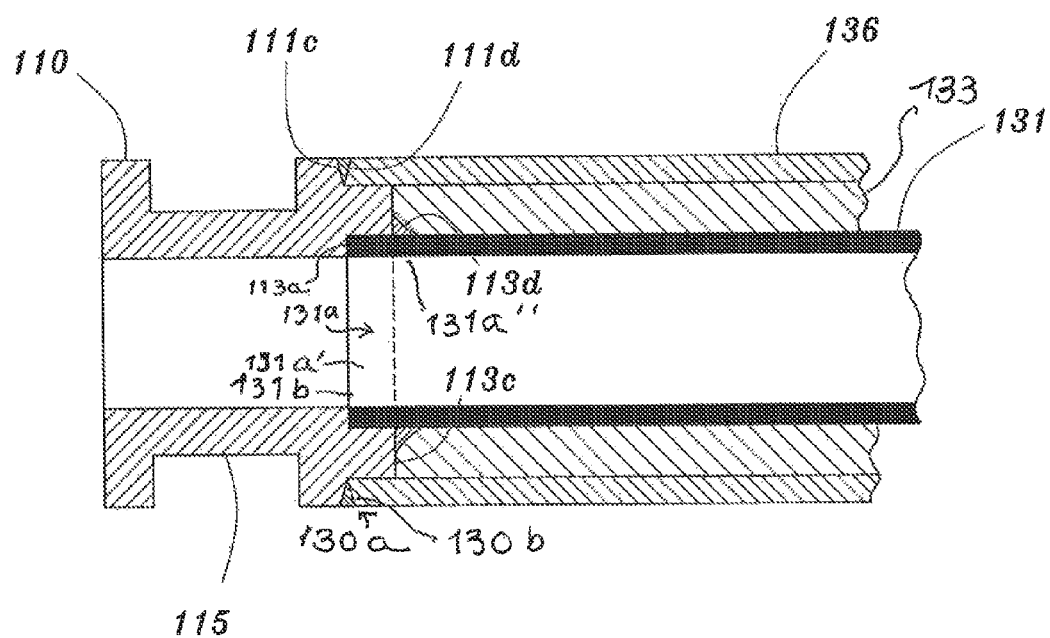
FIG. 6A illustrates the fillet weld 113d and the butt weld 111d.
Figure 7:
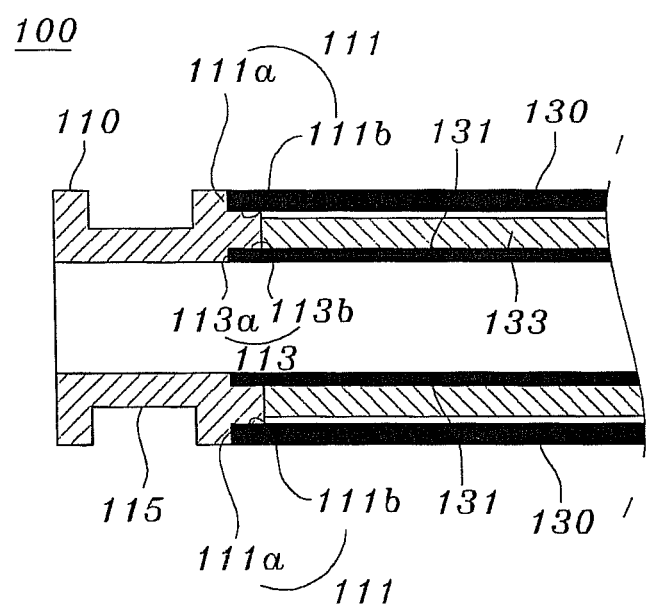
FIG. 7 illustrates a butt welding process in a method of manufacturing a nuclear fuel rod according to an embodiment of the present invention.
Figure 8:
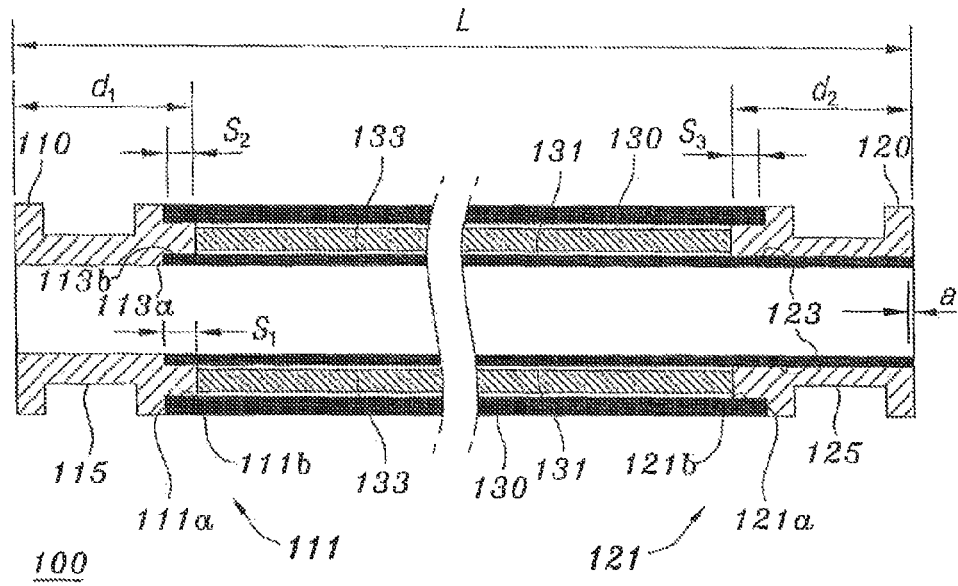
FIG. 8 illustrates a finish welding process in a method of manufacturing a nuclear fuel rod according to an embodiment of the present invention.
Figure 9:
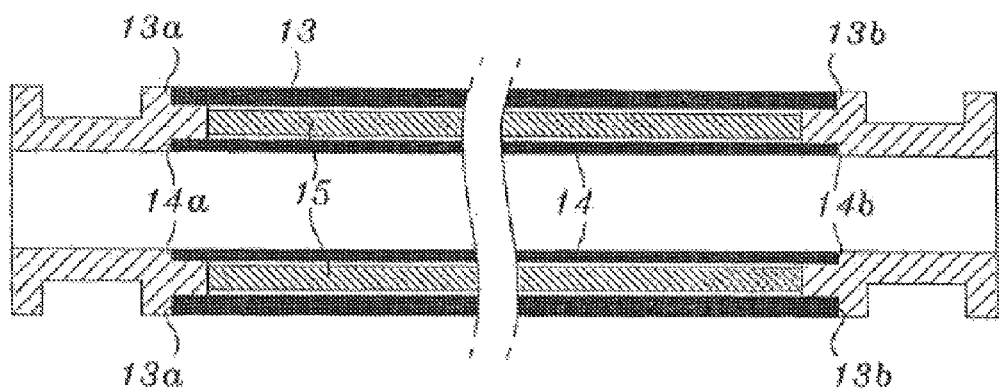
FIG. 9 is a cross-sectional view illustrating a conventional dual-cooled nuclear fuel rod.
Figure 10:
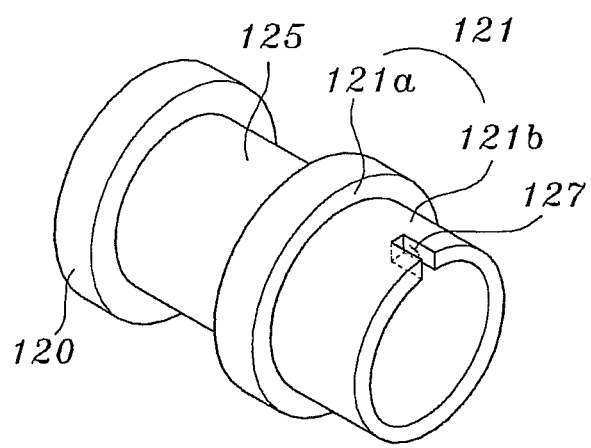
FIG. 10 illustrates an example of forming a slit in a second end plug in accordance with an embodiment of the present invention.

FIG. 5 is a block diagram illustrating a method of manufacturing a nuclear fuel rod according to an embodiment of the present invention. FIGS. 6 and 6A illustrate a fillet welding process in a method of manufacturing a nuclear fuel rod according to an embodiment of the present invention. FIG. 7 illustrates a butt welding process in a method of manufacturing a nuclear fuel rod according to an embodiment of the present invention. FIG. 8 illustrates a finish welding process in a method of manufacturing a nuclear fuel rod according to an embodiment of the present invention. FIG. 10 illustrates an example of forming a slit in a second end plug in accordance with an embodiment of the present invention. FIG. 9 is a cross-sectional view illustrating a conventional dual-cooled nuclear fuel rod.

As illustrated in FIG. 5, the method of manufacturing a nuclear fuel rod according to an embodiment of the present invention includes a fillet welding process S110, a pellet charging process S120, a butt welding process S130, and a finish welding process S140.

As illustrated in FIG. 6, in the fillet welding process S110, a first end 131a of the inner cladding tube 131 having a hollow cylindrical shape is inserted up to and welded to a stepped inner joint 113 formed on an inner circumference of the first or inner end of the first end plug 110 having a hollow cylindrical shape. The inner cladding tube terminates at radial end wall 131b.

At this time, the inner joint 113 of the first end plug 110 is configured so that a stepped end 113a thereof has a radial depth equal to a thickness of the inner cladding tube 131, and an inner wall 113b thereof has a diameter equal to an outer diameter of the inner cladding tube 131.

In detail, as shown in FIG. 6A, the radial end wall 131b of the inner cladding tube 131 is inserted up to the stepped end 113a of the inner joint 113 of the first end plug 110. A boundary 113e where the inner cladding tube 131 abuts on the first end plug radial wall 113c is subjected to fillet welding 113d. First end plug 110 includes radial walls 111c and 113c.

If the thickness of the inner cladding tube 131 is thin, the inner cladding tube 131 may be melted and perforated by welding heat. As such, a welding flash is provided to a mouth of the first end plug 110 such that the welding flash can be melted and bonded when welded.

In the pellet charging process S120, the pellet 133 is charged around the outer circumference of the inner cladding tube 131 coupled with the first end plug 110 after the fillet welding process S110. Here, the pellet refers to the nuclear fuel made of uranium, plutonium, thorium, or the like.

As illustrated in FIGS. 5, 6A and 7, the butt welding process S130, the pellet 133 is surrounded with the outer cladding tube 130 having a hollow cylindrical shape in such a manner that a first end of the outer cladding tube 130 is inserted up to a stepped outer joint 111 formed on an outer circumference of the first end of the first end plug 110. Then, the first end of the outer cladding tube 130 is welded to the outer joint 111 of the first end plug 110.

At this time, the outer joint 111 of the first end plug 110 is configured so that a stepped end 111a thereof has a radial depth equal to a thickness of the outer cladding tube 130, and an outer wall 111b thereof has a diameter equal to an inner diameter of the outer cladding tube 130.

In detail, the first end of the outer cladding tube 130 is inserted up to the stepped end 111a of the outer joint 111 of the first end plug 110. A boundary where the outer cladding tube 130 abuts radial wall 111c on the first end plug 110 is subjected to butt welding at 111d.

Figure 8A:
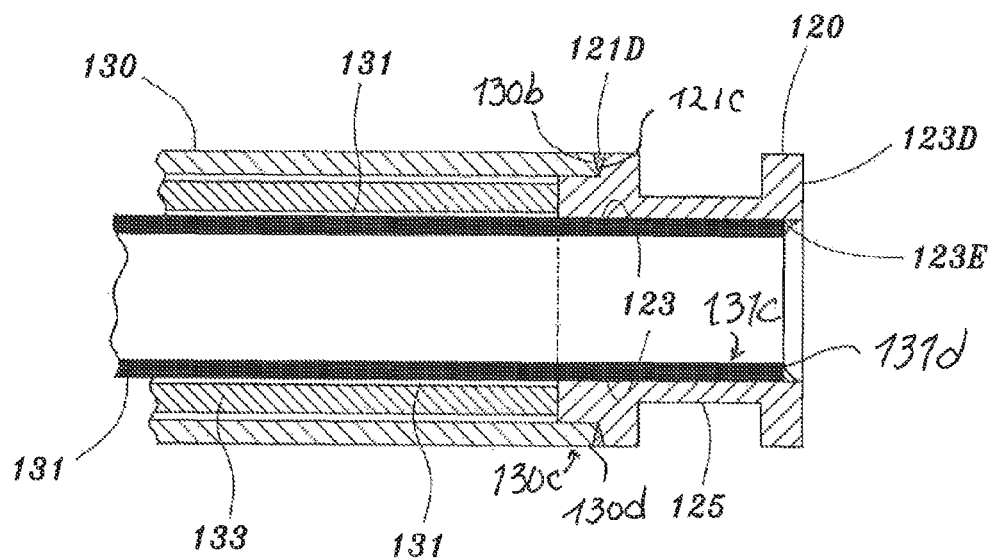
FIG. 8A illustrates the butt weld 121D and the edge weld 123E.

As illustrated in FIGS. 8 and 8a, in the finish welding process S140, a process of performing edge welding of the second end of the inner cladding tube 131 and an inner joint 123 formed on an inner circumference of the second end plug 120, and a process of performing butt welding 121D of the second end of the outer cladding tube 130 and an outer joint 121 formed on an outer circumference of the first end of the second end plug 120 are continuously carried out.

Further, the outer joint 121 of the second end plug 120 is configured so that a stepped end 121a thereof has a radial depth equal to a thickness of the outer cladding tube 130. An inner circumference 123 along the inner joint of the second end plug 120 is identical to the outer diameter of the inner cladding tube 131.

In detail, the second end 131b of the inner cladding tube 131 is completely inserted into the inner circumference 123 of the second end plug 120 until it abuts on a radial end face 123D of the second end of the second end plug 120. A boundary or radial end wall 131d where the inner cladding tube 131 abuts on the radial end face 123D second end plug 120 is subjected to edge welding 123E. The second end area 130c of the outer cladding tube 130 is inserted up to the outer joint radial wall 121C of the terminus of stepped end 121a of the second end plug 120, and the end wall 130d where the outer cladding tube 130 abuts the radial wall 121c on the second end plug 120 is subjected to butt welding u121D. Here, the edge welding may be followed by the butt welding 121D.

The welding may be one selected from arc welding, gas welding, resistance welding, laser beam welding, electromagnetic beam welding, and thermit welding. The arc welding may be tungsten inert gas (TIG) welding, and the resistance welding may be resistance pressure welding (RPW).

Further, as illustrated in FIG. 8, the inner cladding tube 131 has a length expressed by $L-d_1+S_1-a$, and the outer cladding tube 130 has a length expressed by $L-d_1-d_2+S_2+S_3$.

Here, L indicates the distance between the second end of the first end plug 110 and the second end of the second end plug 120, namely the entire length of the dual-cooled nuclear fuel rod having the annular plugs manufactured using the method of manufacturing a nuclear fuel rod according to an embodiment of the present invention, $d_1$ indicates the length of the first end plug 110, $d_2$ indicates the length of the second end plug 120.

Further, $S_1$ indicates the length of the inner wall 113b provided to couple the first end plug 110 with the inner cladding tube 131, $S_2$ indicates the length of the outer wall 111b provided to couple the first end plug 110 with the outer cladding tube 130, and $S_3$ indicates the length of the inner wall 121b provided to couple the outer joint 121 of the second end plug 120 with the outer cladding tube 130.

Finally, "a" indicates the length that corresponds to a gap between the other end of the inner cladding tube 131 and the second end of the second end plug 120 in order to perform the edge welding when the inner cladding tube 131 is inserted into the second end plug 120, and can be determined by welding conditions.

As illustrated in FIG. 9, a convention dual-cooled nuclear fuel rod is configured so that four zones, i.e. outer welding zones 13a and 13b and inner welding zones 14a and 14b, must be welded. At this time, since the outer welding zones 13a and 13b are welded outside an outer tube 13, there is no difficulty in applying a typical welding method. However, the inner welding zones 14a and 14b must be welded using a welding torch inserted into the hollow portion of an inner tube 14. In the case where an inner diameter of the inner tube 14 is small, it is difficult for the welding torch to approach the hollow portion of the inner tube 14, so that it is difficult to weld the inner welding zones 14a and 14b.

For this reason, the inner cladding tube 131 is prolonged, so that the inner cladding tube 131 can be welded outside by edge welding without inserting the welding torch into the hollow portion.

Further, as illustrated in FIG. 4, the dual-cooled nuclear fuel rod having annular plugs according to an embodiment of the present invention includes the first end plug 110, the second end plug 120, the outer cladding tube 130, the inner cladding tube 131, and the pellet 133.

The first end plug 110 has the hollow cylindrical shape, and prevents the pellet 133 from escaping by coupling one end of the outer cladding tube 130 to the stepped outer joint 111 formed on the outer circumference of the first end of the first end plug 110, and by coupling one end of the inner cladding tube 131 to the stepped inner joint 113 formed on the inner circumference of the first end of the first end plug 110.

Further, the first end plug 110 is configured so that the outer diameter thereof is equal to the outer diameter of the outer cladding tube 130, and the inner diameter thereof is equal to the inner diameter of the inner cladding tube 131. At this time, the outer diameter of the first end plug 110 refers to a large outer diameter excluding the diameter of the outer joint 111, and the inner diameter of the first end plug 110 refers to a small outer diameter excluding the diameter of the inner joint 113.

The first end plug 110 includes the outer joint 111, the inner joint 113, and a coupling recess 115.

The outer joint 111 is a portion that is coupled with the outer cladding tube 130, and includes the stepped end 111a and the outer wall 111b and the radial wall 111c.

The stepped end 111a is an end whose outer diameter is reduced by machining the outer circumference of the first end of the first end plug 110, has the radial depth equal to a difference between the outer and inner radii of the outer cladding tube 130, and is coupled with one end of the outer cladding tube 130.

The outer wall 111b has an outer circumference whose diameter is smaller than the outer diameter of the first end plug 110, has a diameter equal to the inner diameter of the outer cladding tube 130, and is coupled with the inner circumference of a first end 130a of the outer cladding tube 130, with the tube end abutting radial wall 111c. The outer cladding tube terminates at the first end radial wall 130b.

The inner joint 113 is a portion that is coupled with the inner cladding tube 131, and includes the stepped end 113a, plug first end 113b and the radial end wall 113c at the plug first end.

The stepped end 113a is an end whose inner diameter is increased by machining the inner circumference of the first end of the first end plug 110, has the radial depth equal to a difference between the outer and inner radii of the inner cladding tube 131, and is coupled with one end of the inner cladding tube 131.

The stepped end 113a has an inner circumference whose diameter is larger than the inner diameter of the first end plug 110, has a diameter equal to the outer diameter of the inner cladding tube 131, and is coupled with the outer circumference of one end 131a of the inner cladding tube 131.

The coupling recess 115 is a recess that is formed in the outer circumference of the first end plug 110 and is clamped by a handling apparatus when a set of dual-cooled nuclear fuel rods having annular plugs 100 are assembled into the nuclear fuel assembly 1.

The second end plug 120 has the hollow cylindrical shape, and seals the pellet 133 by coupling the other or second end 130c of the outer cladding tube 130 to the stepped outer joint 121 formed on the outer circumference of the first end of the second end plug 120, and by coupling the other end of the inner cladding tube 131 to the inner circumference of the first end of the second end plug 120.

Further, the second end plug 120 is configured so that the outer diameter thereof is equal to the outer diameter of the outer cladding tube 130, and the inner diameter of circumference 123 thereof is equal to the outer diameter of the inner cladding tube 131. At this time, the outer diameter of the second end plug 120 refers to a large outer diameter excluding the diameter of the outer joint 121, i.e. the outer diameter of the dual-cooled nuclear fuel rod having annular plugs.

The second end plug 120 includes the outer joint 121, the inner joint 123, and a coupling recess 125, and further includes a slit 127 depending on circumstances.

The outer joint 121 is a portion that is coupled with the outer cladding tube 130, and includes the stepped end 121a terminating at a radial wall 121c and the outer wall 121b.

The stepped end 121a is an end whose outer diameter is reduced by machining the outer circumference of the first end of the second end plug 120, has the radial depth equal to a difference between the outer and inner radii of the outer cladding tube 130, and is coupled with the other end of the outer cladding tube 130.

The outer wall 121b is an outer circumference whose diameter is smaller than the outer diameter of the second end plug 120, has a diameter equal to the inner diameter of the outer cladding tube 130, and is coupled with the inner circumference of the other end of the outer cladding tube 130.

The inner joint 123 refers to the inner circumference of the second end plug 120 which is coupled with a part of the outer circumference of the other end of the inner cladding tube 131.

The coupling recess 125 is a recess that is formed in the outer circumference of the first end plug 110 and is clamped by a handling apparatus when a set of dual-cooled nuclear fuel rods 100 having annular plugs are assembled into the nuclear fuel assembly 1.

As illustrated in FIG. 10, the slit 127 may be formed in the outer joint 121 such that filling gas can be more easily injected between the outer cladding tube 130 and the inner cladding tube 131, and the number of slits 127 may be one or more.

At this time, the filling gas is helium (He), is sealed along with the pellet 133 at a predetermined pressure, and transmits the heat generated from the pellet 133 to the outer and inner cladding tubes 130 and 131.

The outer cladding tube 130 is a tube that has a hollow cylindrical shape and a circular cross section in a longitudinal direction, and may be made of a zirconium alloy.

The inner cladding tube 131 has the hollow cylindrical shape, an outer diameter smaller than the inner diameter of the outer cladding tube 130, and a length longer than the outer cladding tube 130, and is located parallel to the outer cladding tube 130 in the hollow portion of the outer cladding tube 130.

The pellet 133 is charged in a space formed between the outer cladding tube 130 and the inner cladding tube 131, and generates energy by nuclear fission.

Meanwhile, the nuclear fuel rod according to the present invention may further include a compression spring (not shown) and a filling gas (not shown).

The compression spring is installed between the pellet 133 and the first end plug 110 or between the pellet 133 and the second end plug 120, and serves to fix the pellet in the dual-cooled nuclear fuel rod 100 having annular plugs. In other words, the compression spring prevents the pellet 133, which is charged between the outer and inner cladding tubes 130 and 131, from moving due to an extra space when the dual-cooled nuclear fuel rod 100 having annular plugs is handled, particularly transported.

The filling gas is filled between the outer and inner cladding tubes 130 and 131 of the dual-cooled nuclear fuel rod 100 having annular plugs, relieves compressive stress of each cladding tube caused by a pressure of the coolant flowing to the outside of the outer cladding tube 130 and to the inside of the inner cladding tube 131, and transmits the heat generated from the pellet 133 to the outer and inner cladding tubes 130 and 131.

Here, the filling gas may include helium (He), and is injected into the dual-cooled nuclear fuel rod 100 having annular plugs in a pressurized state before the outer and inner cladding tubes 130 and 131 are welded to and sealed by the first and second end plugs 110 and 120.

Although example embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of manufacturing a dual-cooled nuclear fuel rod assembly including inner and outer cladding tubes, pellets of nuclear fuel and a first and a second annular end plug, comprising the steps:

providing a first annular end plug having inner and outer circumferences having respective diameters, a first end having an inner stepped joint undercut a distance into the inner circumference, the inner stepped joint intersecting a radial inner wall at its inner end and terminating at a radial end wall of the first end plug; and an outer stepped joint having an outer circumference with a diameter and extending between an inner radial wall intersected by the outer circumference and said radial end wall of said first end, said inner radial wall extending radially between the outer circumference of the outer stepped joint and the outer circumference of the first end plug;

providing an inner cladding tube having inner and outer circumferences with respective diameters, and a first end area and second end area, and further having a wall thickness corresponding to the undercut distance of the inner stepped joint, said first end area terminating at a first radial end wall of the inner cladding tube, said second end area terminating at a second radial end wall of the inner cladding tube;

providing an outer cladding tube having a first end area terminating at a first end radial wall and a second end area terminating at a second radial wall of the outer cladding tube, inner and outer circumferences with respective diameters, said inner circumference corresponding in diameter to the outer circumference diameter of said outer stepped joint of the first annular end plug;

placing the first end of the inner cladding tube within said inner stepped joint of said first end plug so that the inner circumference of the first end plug is continuous with the inner circumference of the first end area of the inner cladding tube and so that a first end area portion of the inner cladding tube is within the inner stepped joint while leaving another first end area portion of the inner cladding tube exposed beyond the first end of the first end plug;

performing a fillet weld between said another first end area portion of the inner cladding tube and the radial end wall of the first end plug where the inner stepped joint intersects the radial end wall to secure the first end area of the inner cladding tube to the radial end wall of the first end plug;

placing the inner circumference of the first end of the outer cladding tube on the outer circumference of the outer stepped joint of the first end plug, and located so that the outer circumference of the first end of the outer cladding tube is continuous with the outer circumference of the first end plug, and so that the first radial end wall of the outer cladding tube abuts the inner radial wall of the outer stepped joint; and performing a butt weld between the first radial end wall of the outer cladding tube and the inner radial wall of the outer stepped joint, placing the pellets between the inner and the outer cladding tubes from the second end areas of the cladding tubes;

providing an annular second end plug with an outer circumference having a diameter; first and second ends terminating at radially extending end walls; an inner circumference having a diameter; a first end radial end wall; a second end radial end wall; a second outer stepped joint located on the second end adjacent the second end radial end wall; said outer stepped joint having a circumference with a diameter that is equal to the diameter of the inner circumference of the outer cladding tube at its second end area; the second outer stepped joint terminating at a second radial wall extending radially between the circumference of the outer stepped joint and the outer circumference of the second end plug;

placing the second outer stepped joint of the second end plug within the second end area of the outer cladding tube so that the inner circumference of the second end area of the outer cladding tube fits closely over the circumference of the second outer stepped joint, with the second radial end wall of the outer cladding tube abutting the second radial wall of the second outer stepped joint, and with the outer circumference of the outer cladding tube continuous with the outer circumference of the second end plug, while placing the outer circumference of the second end area of the inner cladding tube within the inner circumference of the second end plug in close fitting relationship, and so that the second end wall of the inner cladding tube is adjacent the outer radial end wall of the second end plug; and performing an edge weld between the second end of the inner cladding tube and the outer radial end wall of the second end plug, and a butt weld between the second radial end wall of the outer cladding tube and the second radial wall of the second outer stepped joint to secure the second ends of the inner and outer cladding tubes to the second end plug, with the pellets contained between the first and second end plugs and the inner and outer cladding tubes, wherein said second end area of the inner cladding tube extends distally beyond the second end area of the outer cladding tube when the inner and outer cladding tubes are welded to the first end plug.

2. The method according to claim 1, wherein the inner cladding tube is longer than the outer cladding tube.

3. The method according to claim 1, including providing a longitudinal and radially extending slit adjacent the inner end of the second end plug, said slit intersecting the inner circumference of the second end plug and the circumference of the second outer stepped joint before welding of the inner and outer cladding tubes to the second end plug.

4. The method according to claim 1, including forming the second end plug without an inner stepped joint corresponding to the inner stepped joint of the first end plug.

5. The method according to claim 1, including forming the diameter of the inner circumference of the second end plug substantially the same as the diameter of the outer circumference of the inner cladding tube through the second end area of the second end plug to the outer radial end wall of the second end plug.

* * * * *